(12) United States Patent
Yokochi (10) Patent No.: US 8,295,420 B2
(45) Date of Patent: Oct. 23, 2012

(54) IMAGE READING DEVICE (75) Inventor: Atsushi Yokochi, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 601 days.

(21) Appl. No.: 12/568,637

(22) Filed: Sep. 28, 2009

(65) Prior Publication Data

US 2010/0080264 A1    Apr. 1, 2010

(30) Foreign Application Priority Data

Sep. 30, 2008    (JP) .................................. 2008-254036

(51) Int. Cl.
    *H04L 7/00*    (2006.01)
(52) U.S. Cl. ........................................ 375/355; 375/371
(58) Field of Classification Search .................. 375/130, 375/140, 147, 355, 371, 373, 354; 327/100, 327/113, 114, 144–147, 156–159; 235/462.28; 348/222, 536, 571, 537
See application file for complete search history.

(56) References Cited

U.S. PATENT DOCUMENTS

| 8,135,103 B1 * | 3/2012 | Courcy et al. ................. 375/354 |
| 8,160,117 B1 * | 4/2012 | Courcy ......................... 375/130 |
| 2006/0176525 A1 * | 8/2006 | Mizuta et al. ................. 358/474 |
| 2009/0059324 A1 * | 3/2009 | Nagase et al. ................. 358/513 |
| 2011/0062994 A1 * | 3/2011 | Kusunoki ........................ 327/48 |

FOREIGN PATENT DOCUMENTS

| JP | 2000-224392 A | 8/2000 |
| JP | 2001-268355 A | 9/2001 |

OTHER PUBLICATIONS

Japan Patent Office, Notification of Reasons for Rejection for Japanese Patent Application No. 2008-254036 (counterpart to above-captioned patent application), dispatched Aug. 24, 2010.

* cited by examiner

*Primary Examiner* — Tesfaldet Bocure
(74) *Attorney, Agent, or Firm* — Baker Botts L.L.P.

(57) ABSTRACT

An image reading device including: a photoelectric conversion device that outputs an analog signal corresponding to an image read from a document; an A-D converter that converts the analog signal into a digital signal; a spread spectrum clock generation unit configured to generate a spread spectrum clock by executing frequency-modulation on a reference clock having a constant frequency; an acquisition timing setting unit configured to set an acquiring timing of the analog signal with reference to the spread spectrum clock; and an acquisition timing correction unit configured to execute a delay correction for the acquiring timing of the analog signal set by the acquisition timing setting unit in accordance with a frequency of the spread spectrum clock defined when the analog signal is outputted. The analog signal acquired at the corrected acquiring timing corrected by the acquisition timing correction unit is converted into the digital signal.

7 Claims, 9 Drawing Sheets

IMAGE READING DEVICE

CROSS-REFERENCE TO RELATED APPLICATION

This application claims priority under 35 U.S.C. §119 from Japanese Patent Application No. 2008-254036, filed on Sep. 30, 2008. The entire subject matter of the application is incorporated herein by reference.

BACKGROUND

1. Technical Field

Aspects of the present invention relate to an image reading device which reads an image from a document.

2. Related Art

Image reading devices having a photoelectric conversion device which reads an image from a document and outputs an analog signal corresponding to the image, and an A-D converter which converts the analog signal outputted by the photoelectric conversion device into a digital signal have been proposed. In the image reading device configured as described above, various types of processing can be executed by converting the analog signal outputted by the photoelectric conversion device into the digital signal via the A-D converter.

When the photoelectric conversion device starts to output the analog signal, the analog signal varies for a certain delay time and thereafter moves into a stable period. Therefore, a possibility, that a value of the acquired analog signal varies due to shift of the acquiring timing of the analog signal which is converted to the digital signal by the A-D converter, arises.

On the other hand, a technique of using a spread spectrum clock obtained by spreading a reference clock having a constant frequency has been proposed for EMI (Electromagnetic Immunity) provisions of electronic appliances accommodating the above described image reading device. However, if the acquiring timing of the analog signal is defined based on the spread spectrum clock, the acquiring timing shifts on a time axis depending on the current frequency of the spread spectrum clock. Therefore, a possibility that the value of the acquired analog signal varies arises.

In such a case, it is possible to acquire the output of the photoelectric conversion device at the timing delayed by a predetermined delay time with an analog delay-unit which defines the predetermined delay time independently of the spread spectrum clock, from the start timing of the output of the analog signal from the photoelectric conversion device.

SUMMARY

However, if the acquiring timing is defined with the analog delay-unit, it becomes necessary to secure a relatively long delay time using the analog delay-unit. In this case, the predetermined delay time defined by the analog delay-unit may vary depending on the environmental variation (e.g., the temperature variation). In addition, if the analog delay-unit is used, it becomes impossible to freely define the delay time in accordance with an operation mode.

Aspects of the present invention are advantageous in that an image reading device configured such that the acquiring timing of an analog signal can be changed freely while the acquiring timing from being affected by environmental variation.

According to an aspect of the invention, there is provided an image reading device, comprising: a photoelectric conversion device that outputs an analog signal corresponding to an image read from a document; an A-D converter that converts the analog signal outputted by the photoelectric conversion device into a digital signal; a spread spectrum clock generation unit configured to generate a spread spectrum clock by executing frequency-modulation on a reference clock having a constant frequency; an acquisition timing setting unit configured to set an acquiring timing of the analog signal to be converted into the digital signal, with reference to the spread spectrum clock generated by the spread spectrum clock generation unit; and an acquisition timing correction unit configured to execute a delay correction for the acquiring timing of the analog signal set by the acquisition timing setting unit in accordance with a frequency of the spread spectrum clock defined when the analog signal is outputted. The analog signal acquired at the corrected acquiring timing corrected by the acquisition timing correction unit is converted into the digital signal by the A-D converter.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

DETAILED DESCRIPTION

Hereafter, an embodiment according to the invention will be described with reference to the accompanying drawings.

Figure 9:
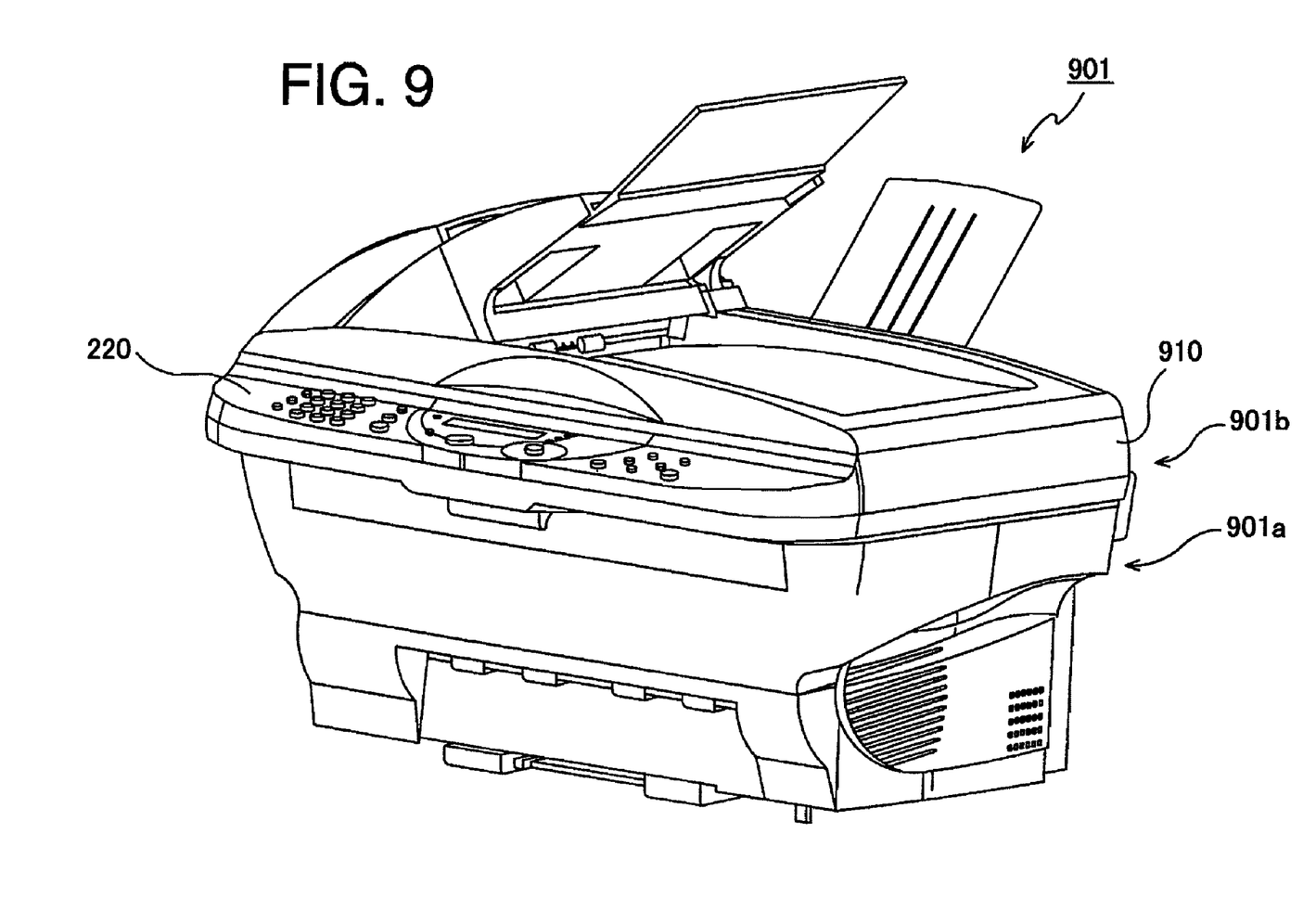
FIG. 9 is a perspective view illustrating an outer appearance of an MFP (Multifunction Peripheral).

As shown in FIG. 9, an MFP (Multifunction Peripheral) 901 according to the embodiment has an upper main body 901b and a lower main body 901a. The upper main body 901b is attached to the lower main body 901a such that the upper main body 901b is openable and closable with respect to the lower main body 901a (i.e., the MFP 901 has a clam shell structure.). The upper main body 901b includes an image reading unit 910. On the front side of the upper main body 901b, an operation panel 220 is provided. The MFP 901 further includes an image formation unit (not show) which forms an image on a recording medium such as a sheet of paper. The image formation unit may be implemented, for example, by a laser printer.

Figure 10:
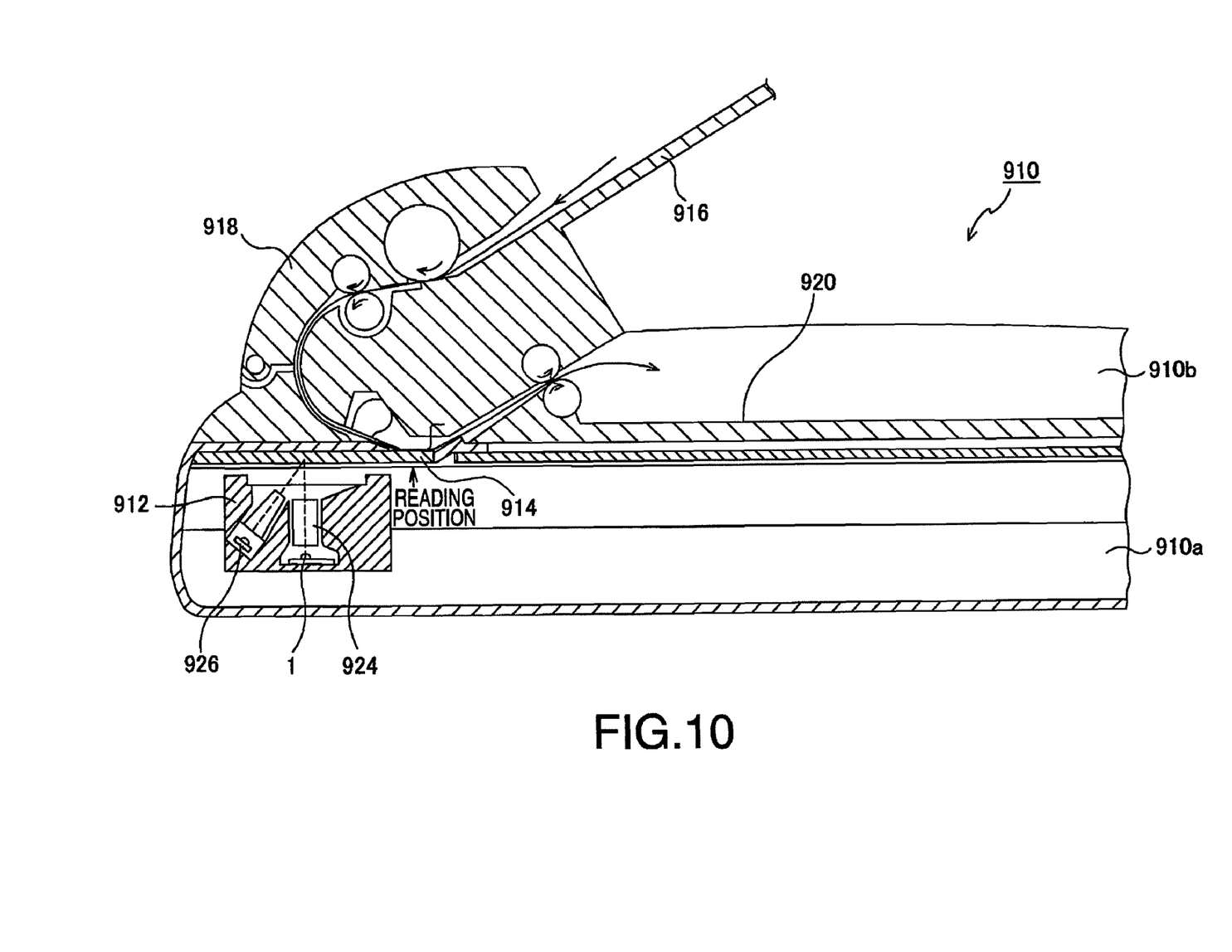
FIG. 10 is a cross sectional view illustrating an internal configuration of an image reading unit of the MFP.

As shown in FIG. 10, the image reading unit 910 has a flat bed (FB) mechanism and an automatic document feeder (ADF). The image reading unit 910 has a flat bed unit 910a and a cover unit 910b. The cover unit 910b is attached to the flat bed unit 910a such that the cover unit 910 is openable and closable with respect to the flat bed unit 910a. That is, the image reading unit 910 has a clam shell structure.

The flat bed unit 910a includes a contact type image sensor 912 and a first platen glass 914. The cover unit 910b includes a document supply tray 916, a document carrying unit 918, and a document output tray 920.

The image sensor 912 includes an CIS (Contact Image Sensor) 1 functioning as a photoelectric conversion device, a SELFOC lens 924, and a light source 926. The image sensor 912 illuminates a document situated at a reading position with the light source 926, converges light reflected from the document with the SELFOC lens 924 to form an image on the CIS 1, and reads the image formed on the CIS 1.

Further, the image sensor 912 is configured to be able to move in a left and right direction on FIG. 10 by a driving mechanism (not shown). When the document is read, the CIS 1 moves to the position beneath the reading position.

Figure 1:
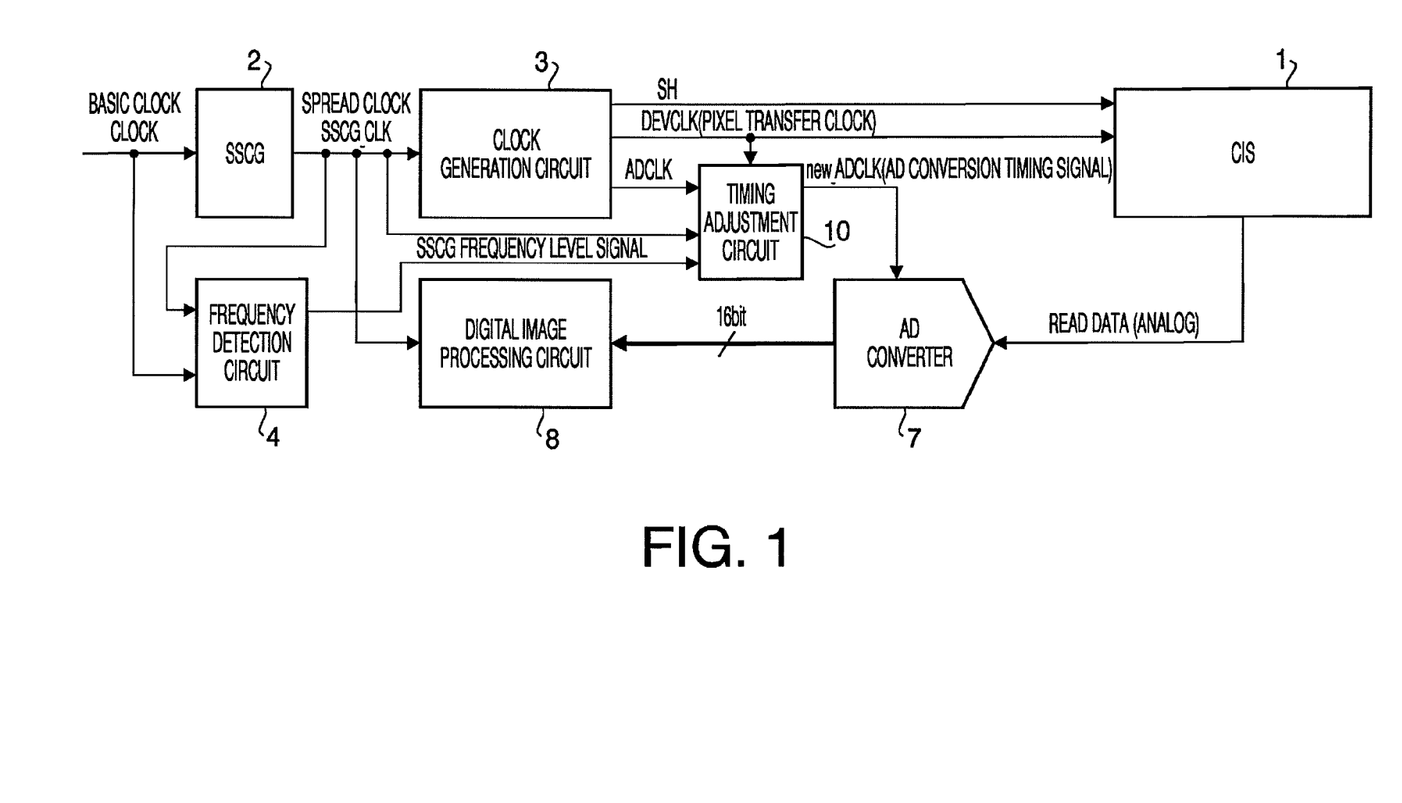
FIG. 1 is a circuit diagram of an image reading unit.

As shown in FIG. 1, the image reading unit 910 is configured to use a one-channel CIS. The image reading unit 910 includes a spread spectrum clock generator (SSCG) 2 which generates a spread spectrum clock SSCG_CLK (hereafter, simply referred to as a spread clock SSCG_CLK) by performing frequency-modulation with respect to a basic clock CLOCK which is generated by a clock generator (not shown) as a reference clock having a constant frequency. The spread clock SSCG_CLK is inputted to a clock generation circuit 3 (functioning as an acquisition timing setting unit).

The clock generation circuit 3 outputs signals using the spread clock SSCG_CLK as a reference. More specifically, the clock generation circuit 3 includes a pixel clock counter which counts one pixel period based on the spread clock SSCG_CLK, and a line period counter which counts the pixel period. The clock generation circuit 3 generates a pixel transfer clock DEVCLK (which is a pixel period signal changing within one pixel period) and a line period signal SH, and outputs the clock signals DEVCKL and SH to the CIS 1. The pixel transfer clock DEVCLK switches between H and L within ½ of one period. The clock generator 3 also generates an A-D conversion timing signal ADCLK (hereafter, simply referred to as a timing signal ADCLK), and outputs the a timing signal ADCLK to a timing adjustment circuit 10. The timing signal ADCLK defines timing for converting an analog signal (read data) outputted from the CIS 1 into a digital signal. The timing signal ADCLK is outputted when a predetermined number of SSCG_CLK pulses are counted after the pixel period is started by rising of the pixel transfer clock DEVCLK.

Figure 2:
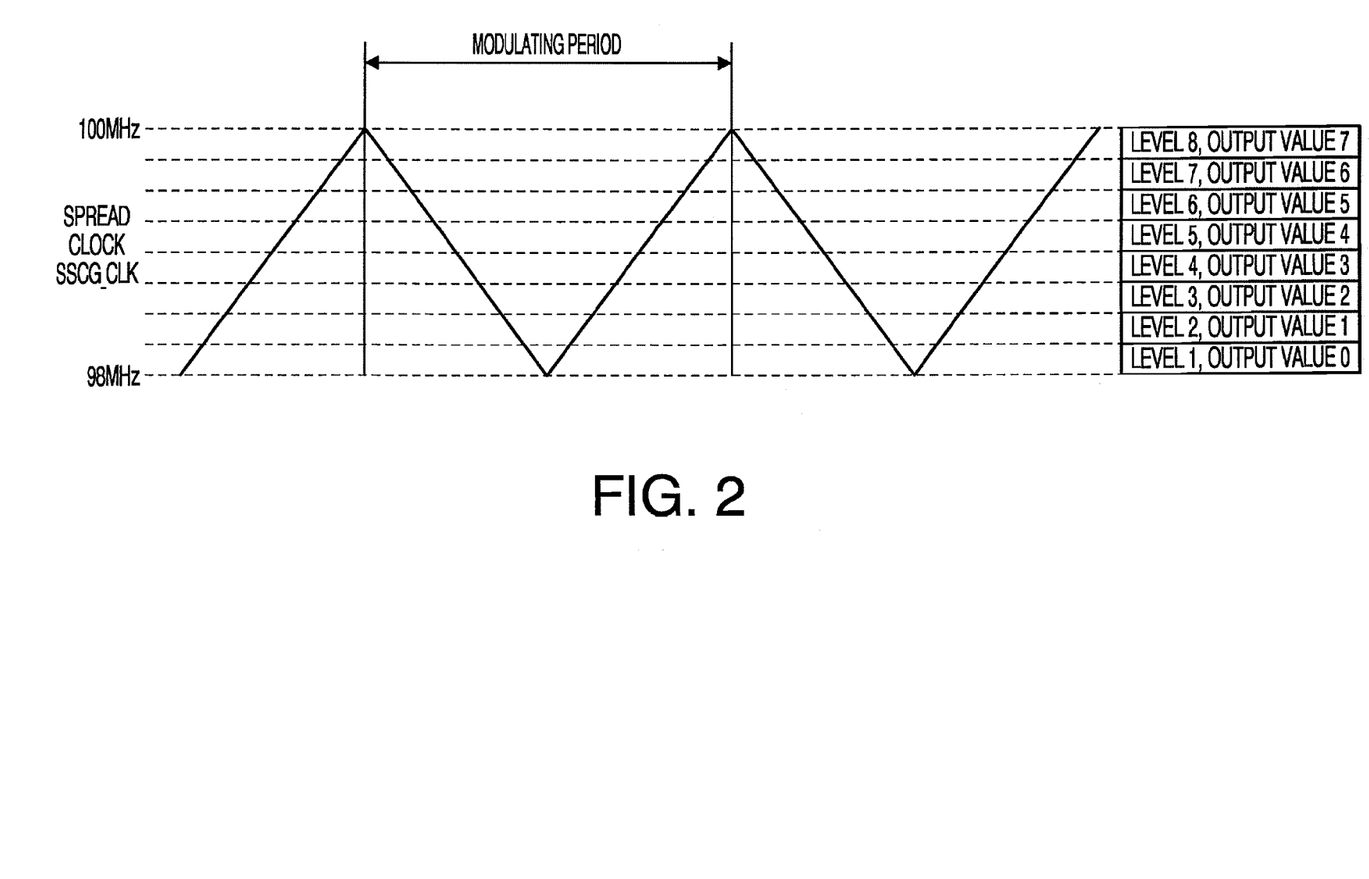
FIG. 2 is an explanatory illustration for explaining change of frequency of a spread spectrum clock in the image reading unit.

The spread clock SSCG_CLK outputted by SSCG 2 is inputted to a frequency detection circuit 4 to which the basic clock CLOCK is also inputted. The frequency detection circuit 4 functions as a level-classification unit. As shown in FIG. 2, the frequency of the spread clock SSCG_CLK changes periodically. The frequency detection circuit 4 classifies the frequency of the spread clock SSCG_CLK into 8 levels (i.e., level 1 to level 8 from the low level) by comparing the spread clock SSCG_CLK with the basic clock CLOCK, and outputs values 0 to 7 in accordance with the detected level, as a SSCG frequency level signal.

The read data outputted by the CIS 1 is converted into digital data by an A-D converter 7, and the converted digital data is inputted to a digital image processing circuit 8. The digital image processing circuit 8 executes various image processing including correction processes (e.g., shading correction and y correction), a resolution conversion process, a filtering process, a color conversion process and a binarization process.

Figure 3:
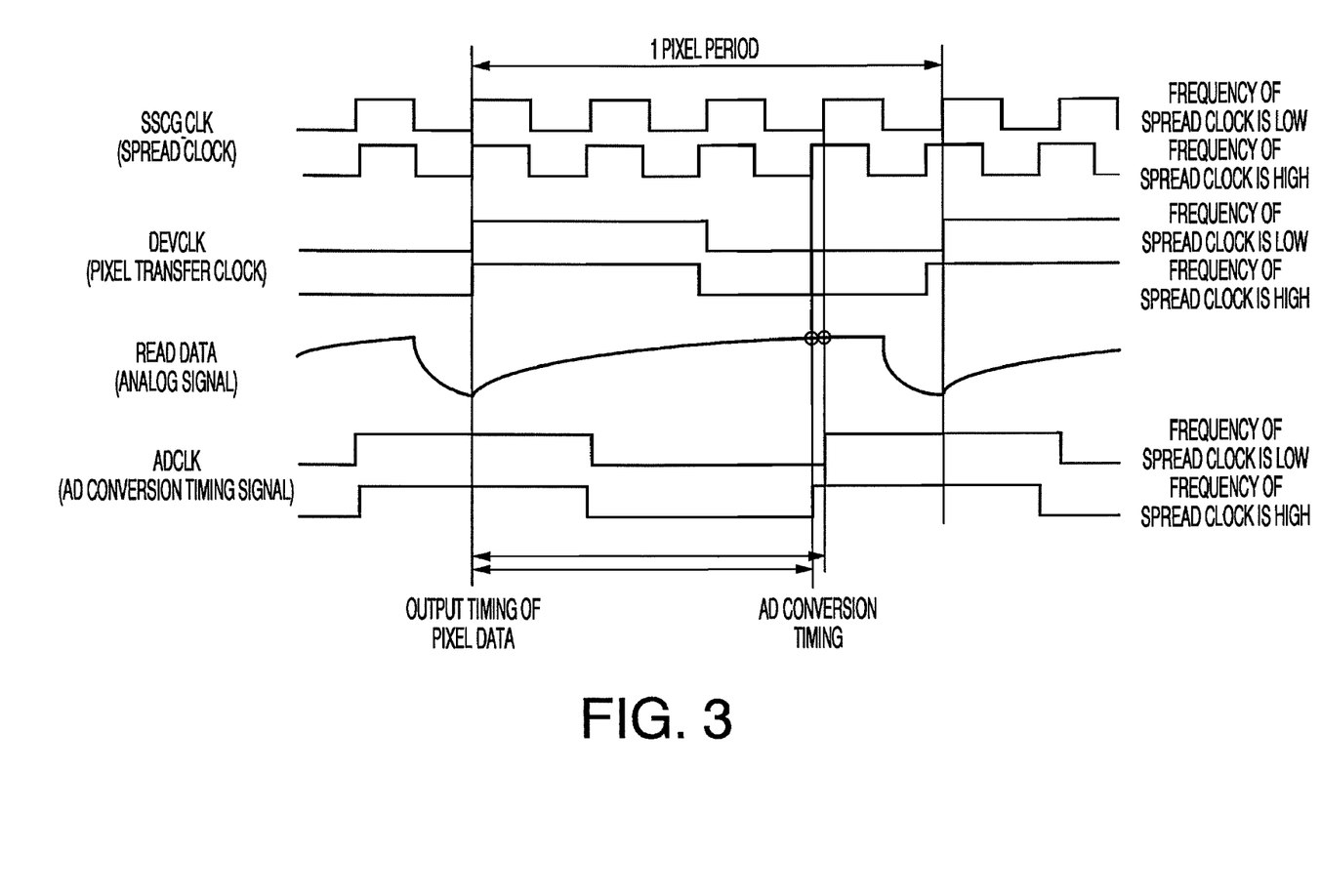
FIG. 3 is a timing chart for explaining the problem caused by change of frequency shown in FIG. 2.

If the A-D conversion by the A-D converter 7 is executed at the timing when the timing signal ADCLK is outputted by the clock generation circuit 3, the following problem arises. As shown in the timing chart of FIG. 3 in which two types of signals are illustrated (one is the case where the frequency of the spread clock is high, and the other is the case where the frequency of the spread clock is low), the period of the spread clock SSCG_CLK varies continuously. Therefore, if the CIS 1 starts reading at the rising edge of the pixel transfer clock DEVCLK and the A-D conversion is executed at the third rising edge of the spread clock SSCG_CLK from the rising of the DEVCLK, the timing of A-D conversion shifts depending on the frequency of the spread clock SSCG as illustrated in FIG. 3. If the timing of A-D conversion is situated at a point at which the analog signal of the read data slants, the resultant digital data also varies depending on the shift of the timing of A-D conversion.

For this reason, the image reading unit 910 according to the embodiment is configured to an corrected timing signal new_ADCLK generated by the timing adjustment circuit 10 (functioning as an acquisition timing correction unit) is inputted to the A-D converter 7 in place of inputting the timing signal AD CLK. With this configuration, the shift of the timing of A-D conversion is suppressed as explained below.

Figure 4:
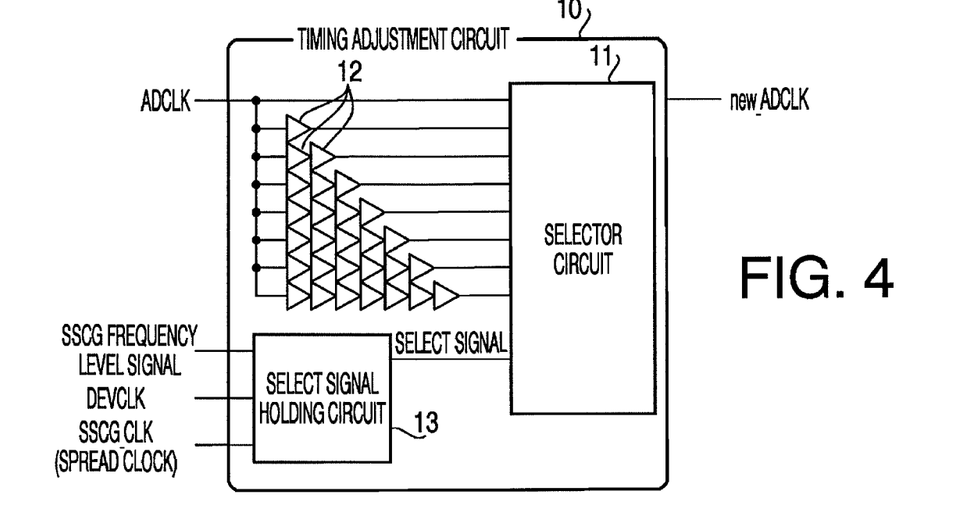
FIG. 4 is a block diagram illustrating in detail a configuration of a timing adjustment circuit.

As shown in FIG. 4, the timing adjustment circuit 10 includes a selector circuit 11 to which the timing signal ADCLK is directly inputted. To the selector circuit 11, delayed timing signals ADCLK which respectively passed one delay element 12, two delay elements 12, three delay elements 12, four delay elements 12, five delay elements 12, six delay elements and seven delay elements are further inputted. Each delay element 12 delays an input signal (i.e., the timing signal ADCLK) by a predetermined correction amount. The predetermined correction amount is determined by an element delay a wire delay.

Figure 5:
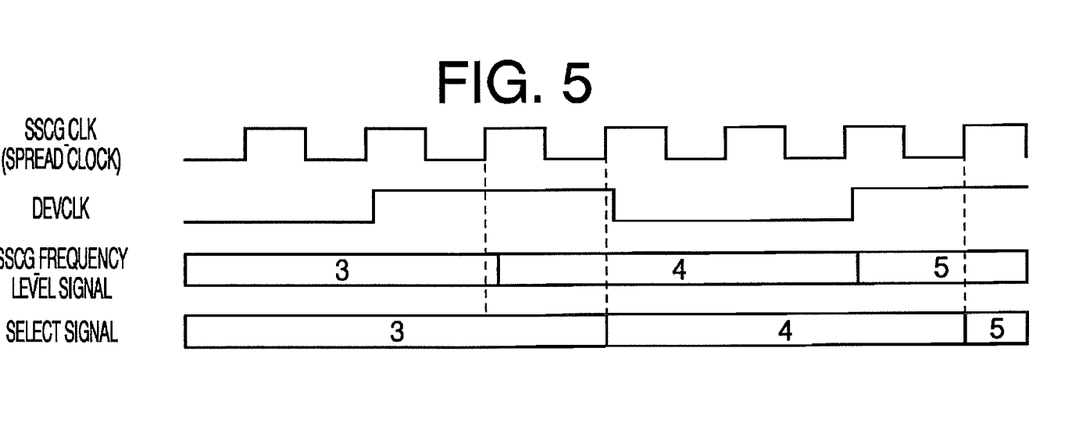
FIG. 5 is a timing chart illustrating operation of a select signal holding circuit.

The timing adjustment circuit 10 also includes a select signal holding circuit 13 which constantly provides a select signal for the selector circuit 11. To the select signal holding circuit 13, the SSCG frequency level signal, the pixel transfer clock DVCLK and the spread clock SSCG_CLK are inputted. Based on these input signals, the select signal holding circuit 13 outputs the select signal. As shown in FIG. 5, when the spread clock SSCG_CLK rises during the H period of the pixel transfer clock DEVCLK, the select signal holding circuit 13 defines the value of the SSCG frequency level signal being outputted as the value of the select signal. Then, the selector circuit 11 outputs the timing signal ADCLK which passed a group of delay elements 12 corresponding to the value of the select signal as the corrected timing signal new_ADCLK. The corrected timing signal new_ADCLK is inputted to the A-D converter 7.

Therefore, the higher the spread clock SSCG becomes (i.e., the larger the value of the SSCG frequency level signal becomes), the larger the delayed amount of the corrected timing signal new_ADCLK becomes. Therefore, according to the embodiment, it becomes possible to suitably prevent the digital data from varying due to shift of the timing of A-D conversion caused by fluctuation of the frequency of the spread clock SSCG_CLK.

In the embodiment, the delay correction is performed with respect to the timing signal ADCLK based on the spread clock SSCG_CLK. Accordingly, the delay time for the delay correction may be a small value, and therefore the delay correction is hard to be affected by the temperature. As shown in FIG. 3, the period in which the pixel transfer clock DEVCLK is "H" is situated on the first half part within the one pixel period and is not interfere the timing of A-D conversion. Therefore, it becomes possible to prevent noise caused by switching of the selector circuit 11 from being superimposed on the signal A-D converted by the A-D converter 7. Furthermore, it becomes possible to prevent the noise caused by switching of the selector circuit 11 from being superimposed on the timing signal ADCLK. Therefore, according to the embodiment, it becomes possible to obtain the digital signal which considerably precisely reflects the original image read by the CIS 1.

Although the present invention has been described in considerable detail with reference to certain preferred embodiments thereof, other embodiments are possible.

In the above described embodiment, the analog signal (read data) is converted into the digital signal by acquiring the value of the analog signal at a point on the time-axis. However, the digital signal may be created by acquiring the analog signal within a certain time period and converting the analog signal acquired within the certain time period into the digital signal as described below.

It is understood that the circuit configuration of the above described embodiment can be employed for the three channel CIS by using three A-D converters. However, if one A-D converter is used, it becomes necessary to temporarily hold the read data in a sample and hold timing having a time period. For this reason, as shown FIG. 6, a clock generation circuit 103 outputs a sample and hold timing signal ADSMP having a certain time period in place of outputting the timing signal ADCLK.

Figure 6:
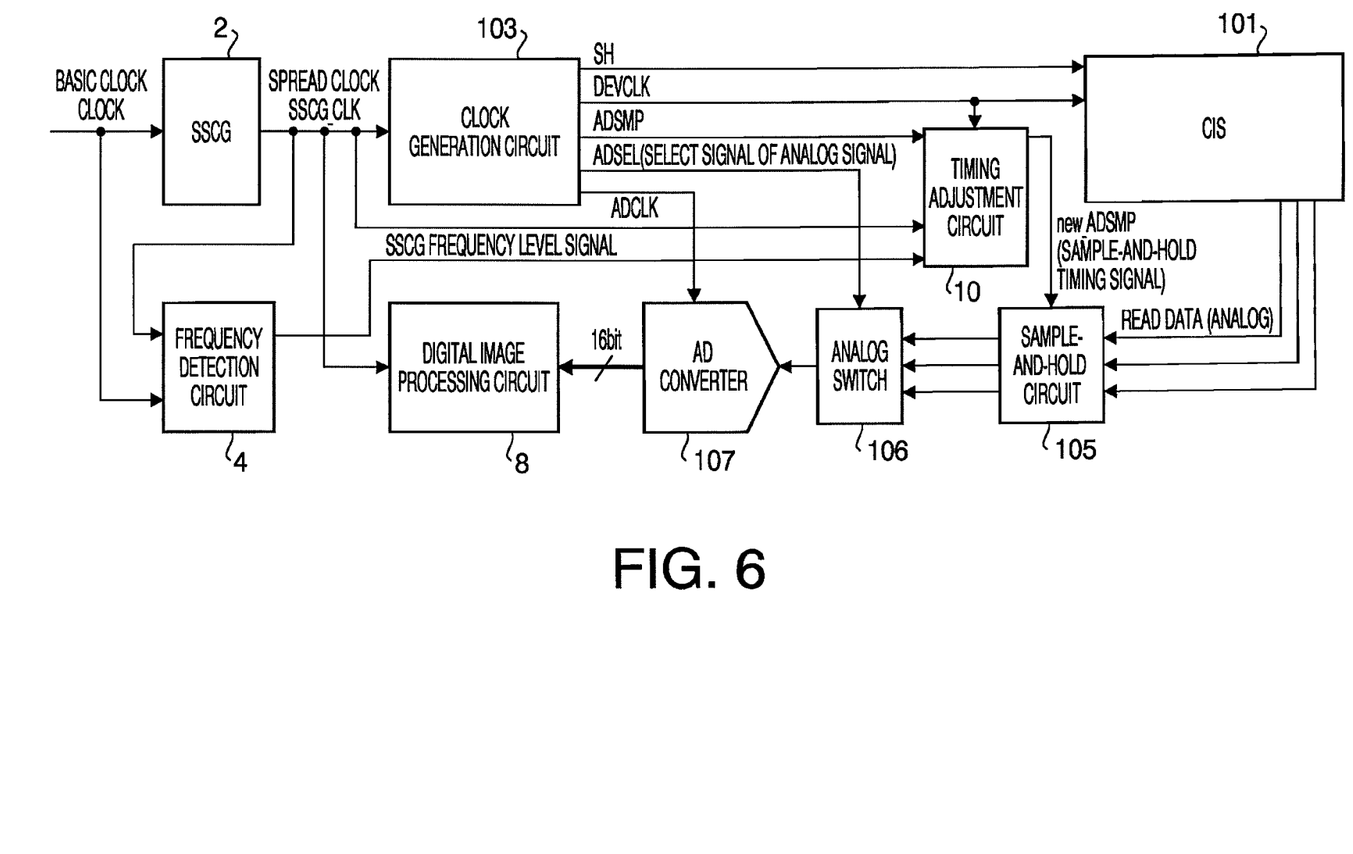
FIG. 6 is a block diagram illustrating a circuit of an image reading unit which uses a three-channel CIS.

The sample and hold timing signal ADSMP is delayed by the above described timing adjustment circuit 10, and a corrected sample and hold timing signal new_ADSMP is inputted to a sample and hold circuit 105. The sample and hold circuit 105 holds the read data (analog signal) in a time period defined by the corrected sample and hold timing signal new_ADSMP, and inputs the held data into an analog switch (analog SW) 106. The analog switch 106 inputs sequentially the read data of each channel into the A-D converter 107, and the A-D converter 107 inputs the A-D converted data into the above described digital image processing circuit 8.

Figure 7:
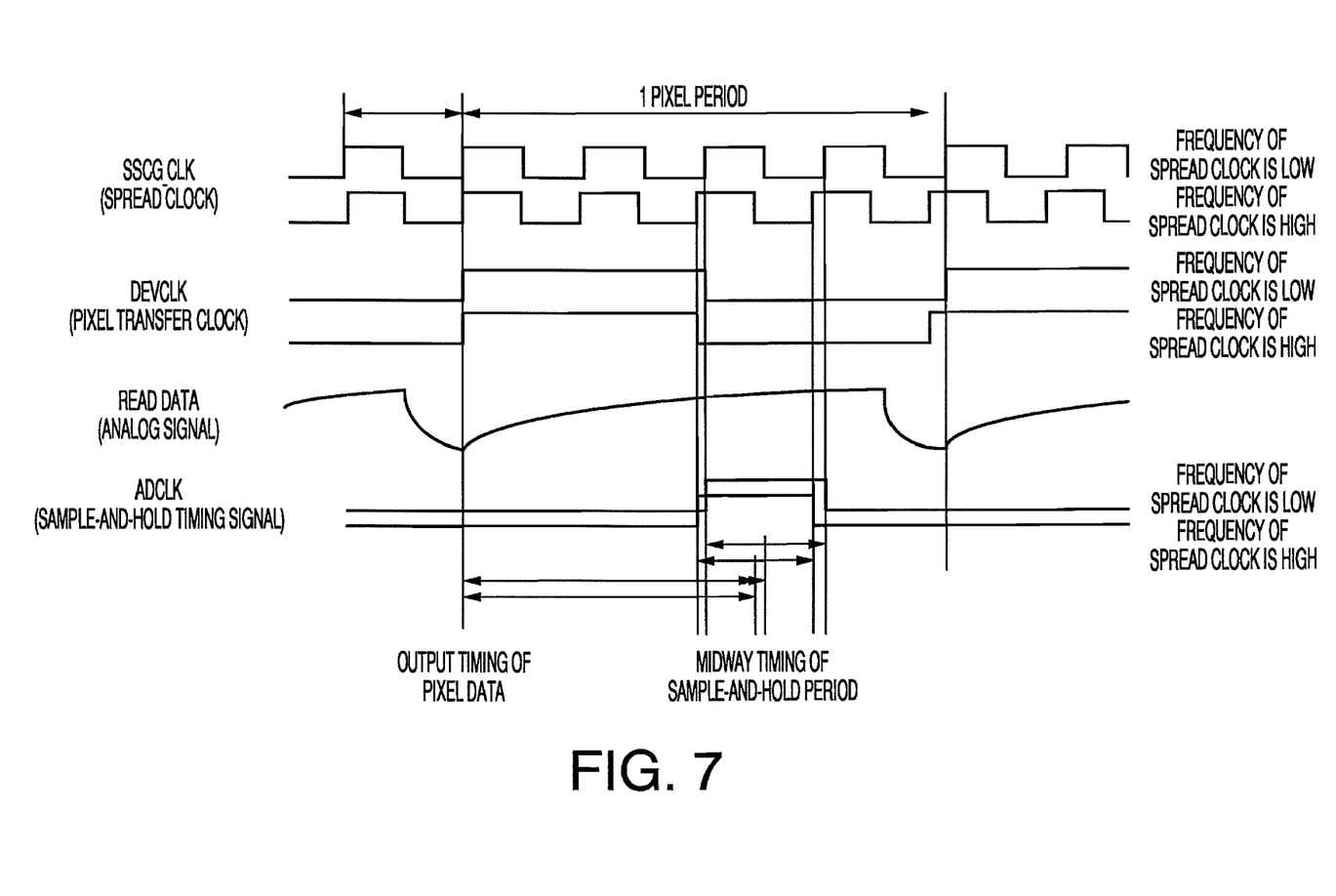
FIG. 7 is a timing chart for explaining the problem arising from the frequency change of a spread clock in the image reading unit shown in FIG. 6.

In this case, if the sample and hold is executed at the timing of output of the sample and hold timing signal ADSMP from the clock generation circuit 103, the same problem as that described in the above described embodiment arises. That is, as shown in FIG. 7, if the sample and hold is executed when the sample and hold timing signal ADSMP becomes "H" in a period from the second clock to the third clock from the rising of the pixel transfer clock DEVCLK, the period for the sample and hold shifts depending on the frequency of the spread clock SSCG. In this case, the value of the digital data obtained by the A-D conversion also changes. By contrast, according to an embodiment, the sample and hold timing signal ADSMP is subjected to the delay correction depending on the frequency of the spread clock SSCG_CLK. Therefore, it becomes possible to suitably prevent the digital data from varying due to variation of the frequency of the spread clock SSCG.

In the above described embodiment, the delay correction is performed for the timing signal ADCLK or the sample and hold timing signal ADSMP based on the spread clock SSCG_CLK. Therefore, it is possible to freely change the timing of A-D conversion by setting desirably what number of pulses of the spread clock SSCG_CLK from the pixel transfer clock DEVCLK the delay correction should be applied to. Accordingly, the generation timing of the timing signal ADCLK may be changed depending on a mode.

For example, for the image reading in a low resolution mode in which the number of pixels in one line is relatively low, control for slightly slowing the pixel period without increasing the line period of one line more than necessary, in regard to EMI and the image quality.

Furthermore, the required bit accuracy of A-D conversion may vary depending on a reading mode. For example, the bit accuracy of 8 bit is sufficient for copy, while the bit accuracy of 16 bit is required for scanning. In this case, in order to output a 16 bit value, 2-fold period with respect to the period of the 8 bit output is required, and therefore the pixel period for scanning is slowed to have the two-fold period of the period for copy. Furthermore, the timing of A-D conversion is also delayed in accordance with change of the pixel period.

Table 1 shows an example of a relationship between a pixel period (i.e., the period of the pixel transfer clock DEVCLK), the timing of A-D conversion (i.e., the interval between the rising of the pixel transfer clock DEVCLK and the rising of the timing signal ADCLK) and a mode.

TABLE 1

|  | Copy 600 dpi | Copy 300 dpi | Scanner 600 dpi | Scanner 300 dpi |
| --- | --- | --- | --- | --- |
| Pixel Period Period of DEVCLK | 5 Clocks | 7 Clocks | 9 Clocks | 12 Clocks |
| Interval Between rising of DEVCLK and rising of ADCLK | 4 Clocks | 6 Clocks | 8 Clocks | 10 Clocks |

Figure 8:
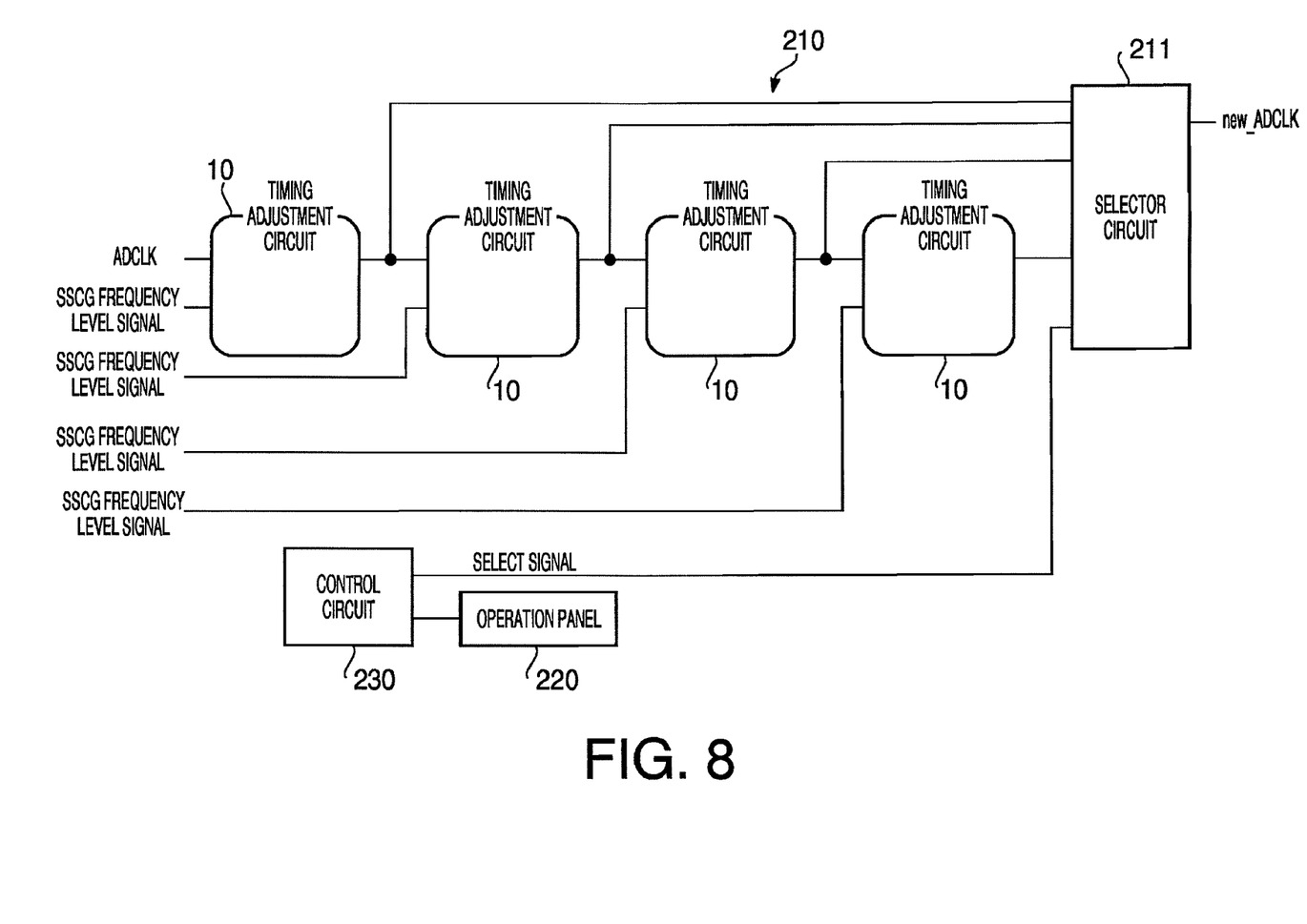
FIG. 8 is a block diagram of a timing adjustment circuit of an image reading device according to another embodiment.

FIG. 8 shows a block diagram of a timing adjustment circuit 210 configured to support the above described operation. As shown in FIG. 8, the timing adjustment circuit 210 is configured such that four timing adjustment circuits 10 are connected in series, and the timing signals ADCLK passing one, two, three and four timing adjustment circuits 10, respectively, are connected to a selector circuit 211. To the selector circuit 211, a select signal is inputted from a control circuit 230 which executes various functions based on the mode set through an operation panel (functioning as a mode setting unit), so that the timing signal ADCLK passed through a certain number of timing adjustment circuits 10 corresponding to the mode is outputted as the corrected timing signal new_ADCLK.

If the timing of A-D conversion is delayed depending on change of the mode, the affect of the frequency of the spread clock SSCG_CLK increases. Therefore, in such a case, the timing signal ADCLK passed larger number of timing adjustment clocks 10 is outputted as the corrected timing signal new_ADCLK. Although not shown in FIG. 8, the spread clock SSCG_CLK and the pixel transfer clock DEVCLK are also inputted to each timing adjustment circuit 10 together with the SSCG frequency level signal. The control circuit 230 inputs a control signal to the clock generation circuit 3 to change the pixel transfer clock DEVCLK and the timing signal ADCLK depending on the mode as shown in Table 1. By configuring the timing adjustment circuit 210 as described above, it becomes possible to change the timing of A-D conversion depending on the mode (i.e., the reading mode) set by the user.

In the above described embodiment, a CIS is used as a photoelectric conversion device. However, the feature of the above described embodiment can also be applied to an image reading device which employs a CCD as a photoelectric conversion device.

In the above described embodiment, the select signal is generated using the pixel transfer clock DEVCLK. However, the select signal may be generated using another signal. The SSCG frequency level signal may be used as the select signal. A signal generated in another way may be used as the select signal.

In the above described embodiment, the delay correction is performed in accordance with the frequency of the spread spectrum signal in the analog signal. However, the delay correction may be performed in accordance with the frequency of the spread spectrum clock.

It is understood that various types of circuit configurations can be employed as the timing adjustment circuit 10. However, as described in the embodiment, by employing the configuration achieved by using the delay element 12 and the sector circuit 11, it is possible to simplify the configuration of the timing adjustment circuit. Consequently, the entire configuration of the image reading device is also simplified suitably.

What is claimed is:

1. An image reading device, comprising:
a photoelectric conversion device that outputs an analog signal corresponding to an image read from a document;
an A-D converter that converts the analog signal outputted by the photoelectric conversion device into a digital signal;
a spread spectrum clock generation unit configured to generate a spread spectrum clock by executing frequency-modulation on a reference clock having a constant frequency;
an acquisition timing setting unit configured to set an acquiring timing of the analog signal to be converted into the digital signal, with reference to the spread spectrum clock generated by the spread spectrum clock generation unit; and
an acquisition timing correction unit configured to execute a delay correction for the acquiring timing of the analog signal set by the acquisition timing setting unit in accordance with a frequency of the spread spectrum clock defined when the analog signal is outputted,
wherein the analog signal acquired at the corrected acquiring timing corrected by the acquisition timing correction unit is converted into the digital signal by the A-D converter.

2. The image reading device according to claim 1, wherein:
the acquisition timing setting unit sets one of a time of rising of the spread spectrum clock and a time of falling of the spread spectrum clock as the acquiring timing; and
the A-D converter converts the analog signal into the digital signal at the corrected acquiring timing.

3. The image reading device according to claim 1, wherein:
the acquisition timing setting unit sets a predetermined time period equivalent to a plurality of pulses of the spread spectrum clock as the acquiring timing; and
the A-D converter holds the analog signal within the predetermined time period of which delay time is corrected by the acquisition timing correction unit, and converts the held analog signal into the digital signal.

4. The image reading device according to claim 1, wherein the acquisition timing correction unit executes the delay correction such that a time period between a start timing of output of the analog signal outputted by the photoelectric conversion device and the acquiring timing is kept constant.

5. The image reading device according to claim 1, wherein:
the acquisition timing correction unit comprises:
a level classification unit configured to classify the frequency of the spread spectrum clock into a plurality of levels;
a plurality of delay elements which delay the acquiring timing by a plurality of different delay amounts, respectively, to generate a plurality of acquiring timings having different delay times, respectively; and
a selector to which the plurality of acquiring timings having the different delay times are inputted, wherein the selector selects one of the plurality of acquiring timings in accordance with a classified level defined by the level classification unit and outputs the selected acquiring timing as the corrected acquiring timing.

6. The image reading device according to claim 1, further comprising:
a mode setting unit configured to set a reading mode of the photoelectric conversion device in accordance with a user operation,
wherein the acquisition timing setting unit sets the acquiring timing in accordance with a time period between a start timing of output of the analog signal outputted by the photoelectric conversion device and the acquiring timing.

7. The image reading device according to claim 1, wherein the acquisition timing correction unit sets a correction amount of the delay correction at a time of not overlapping with the corrected acquiring timing and not corrected acquiring timing.

* * * * *